United States Patent [19]

Hedel

[11] 4,362,236

[45] Dec. 7, 1982

[54] WORKPIECE LOADER

[75] Inventor: Rudolph H. Hedel, West Windsor, N.J.

[73] Assignee: RCA Corporation, New York, N.Y.

[21] Appl. No.: 205,916

[22] Filed: Nov. 12, 1980

[51] Int. Cl.³ ............................................. B65G 47/12
[52] U.S. Cl. ..................................... 198/446; 198/954; 206/564
[58] Field of Search ............... 198/446, 563, 546, 617, 198/540, 771, 758, 609, 382, 445, 954; 206/564, 309; 220/22; 414/745

[56] References Cited

U.S. PATENT DOCUMENTS

| | | |
|---|---|---|
| 2,632,588 | 3/1953 | Hoar, Jr. ......................... 198/609 X |
| 3,270,877 | 9/1966 | Hecker . |
| 3,534,862 | 8/1970 | Shambelan ..................... 206/564 X |
| 3,678,892 | 7/1972 | Fairchild . |
| 3,682,291 | 8/1972 | Lent ................................... 198/446 |
| 3,713,527 | 1/1973 | Ginther .............................. 198/445 |
| 4,195,734 | 4/1980 | Boner et al. ..................... 206/564 X |

*Primary Examiner*—John J. Love
*Assistant Examiner*—Paul A. Sobel
*Attorney, Agent, or Firm*—B. E. Morris; D. S. Cohen; T. H. Magee

[57] ABSTRACT

A workpiece loader includes a processing tray having two parallel sets of substantially V-shaped grooves adjacent a surface thereof, the grooves of one set alternating with and having a depth greater than the depth of the grooves of the other set. The workpiece loader further comprises an aligning tray having a plurality of substantially V-shaped grooves adjacent a surface thereof and parallel to each other, the grooves of the aligning tray having a depth greater than the depth of the grooves of the other set and having a periodicity equal to the periodicity of the grooves of the other set, the aligning and processing trays being positioned in tandem so that the grooves of the other set are aligned with the grooves of the aligning tray.

13 Claims, 3 Drawing Figures

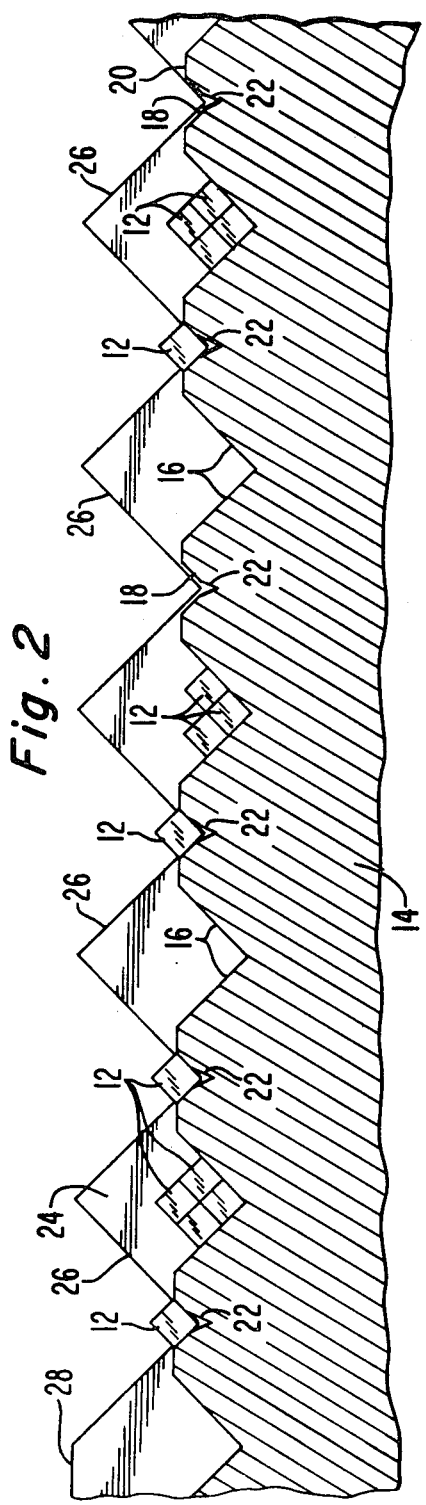
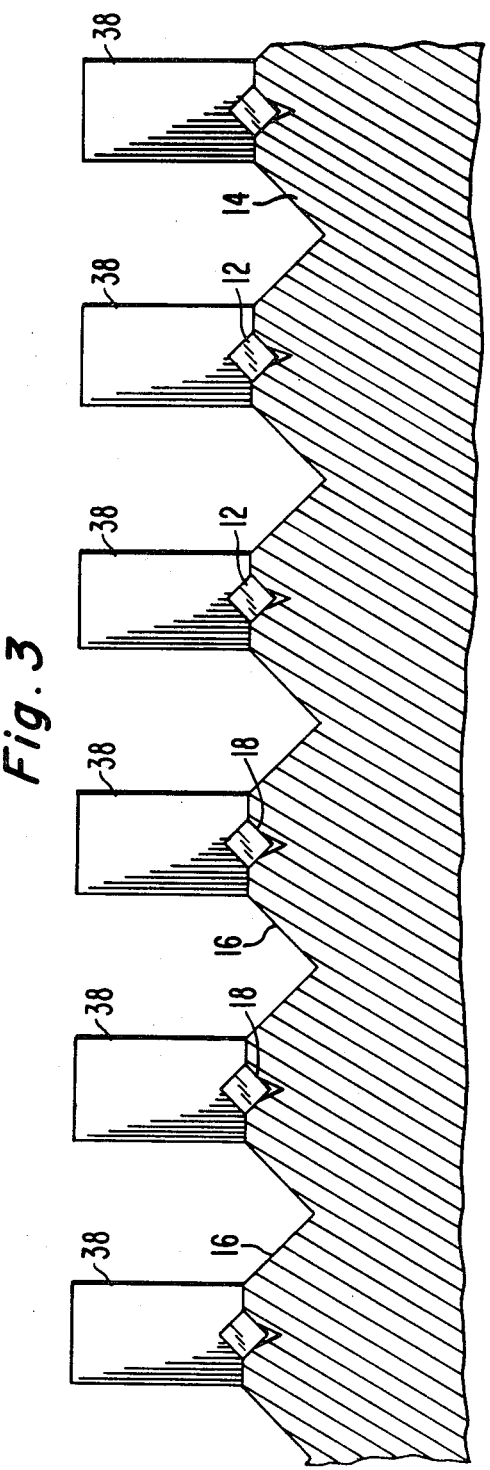

WORKPIECE LOADER

This invention relates to a technique for loading workpieces, such as diamond logs.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus tip is typically micromachined from natural or synthetic diamond. However, before the stylus tip is formed, an electrically conductive material is formed adjacent the stylus to serve as the conductive electrode.

The electrically conductive material is typically a metal which is deposited onto the stylus in a vacuum deposition chamber. During this deposition process, the styli generally take the form of elongated workpieces, or logs, which are supported along parallel grooves disposed in a suitable coating tray. Since the diamond logs have a thickness of only about 0.35 millimeter and tend to have an electrostatic charge thereon, it is difficult to load such logs into the coating tray so that each groove contains a full row of single logs, in order to achieve maximum economy and yield during the deposition process. The present invention provides a novel technique for loading workpieces whereby complete rows of single logs are easily achieved.

SUMMARY OF THE INVENTION

The present invention comprises an apparatus for loading workpieces in preparation for coating the workpiece in a deposition chamber. The apparatus includes a processing tray having two parallel sets of substantially V-shaped grooves adjacent a surface thereof, the grooves of one set alternating with and having a depth greater than the depth of the grooves of the other set. The workpiece loader further comprises an aligning tray having a plurality of substantially V-shaped grooves adjacent a surface thereof and parallel to each other, the grooves of the aligning tray having a depth greater than the depth of the grooves of the other set and having a periodicity equal to the periodicity of the grooves of the other set. The aligning and processing trays are positioned in tandem so that the grooves of the other set are aligned with the grooves of the aligning tray.

BRIEF DESCRIPTION OF THE DRAWING

FIG. 2 is an enlarged partial cross-sectional view taken along line 2—2 of FIG. 1.

FIG. 3 is an enlarged partial cross-sectional view taken along line 3—3 of FIG. 1.

DETAILED DESCRIPTION OF THE PREFERRED EMBODIMENT

Figure 1:
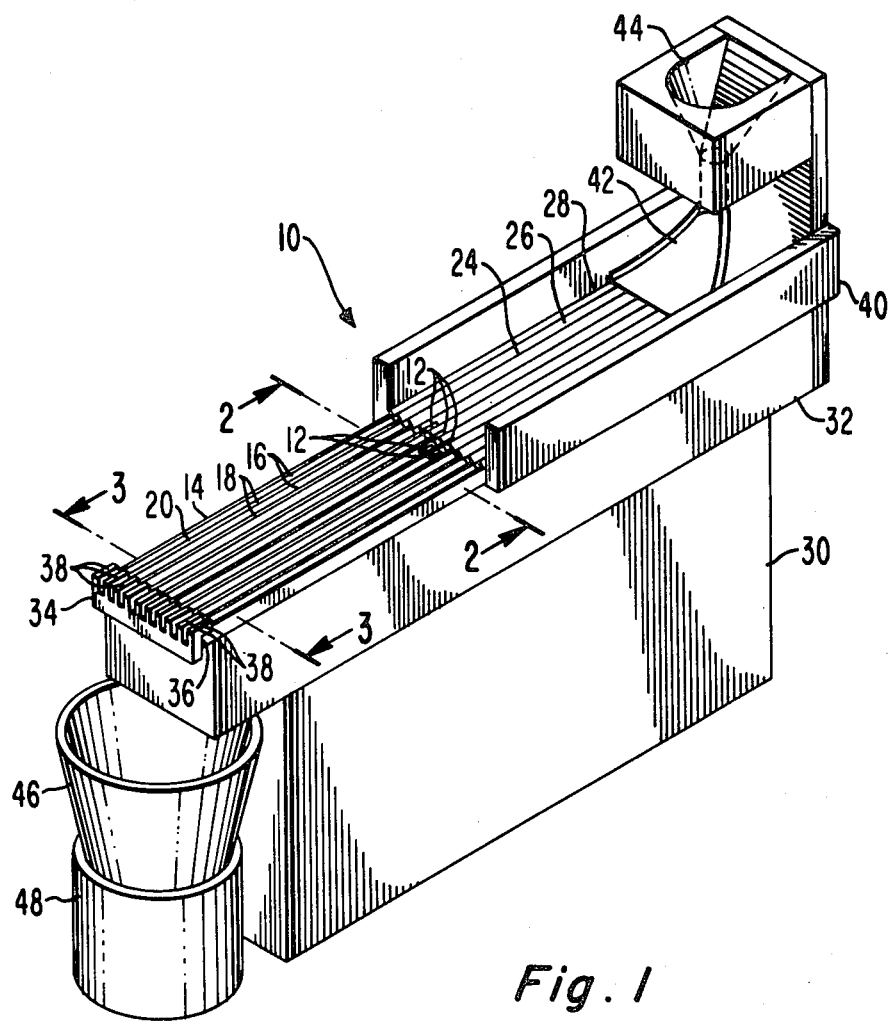
FIG. 1 is a perspective view illustrating the present novel invention.

In FIG. 1 of the drawing, there is shown one embodiment of an apparatus 10 for loading workpieces in preparation for coating the workpieces with a conductive material in a vacuum deposition chamber. In the present example, the workpieces comprise diamond logs 12 which are shaped in the form of parallelepipeds having a thickness of about 0.35 millimeter and a length of about 2 millimeters. The apparatus 10 comprises a processing tray 14 having two parallel sets of grooves 16 and 18 adjacent a surface 20 thereof. The grooves 16 of one set alternate with and have a depth greater than the depth of the grooves 18 of the other set, as shown in FIG. 2 of the drawing. In the present embodiment, the grooves 16 and 18 are substantially V-shaped and have a side slope of about 45 degrees. The dimensional scale of the present processing tray 14 is designed so that the side length of the grooves 18 of the other set, i.e., the distance along the side of the groove 18 from the surface 20 to the vertex of the groove 18, is equal approximately to the width of the diamond logs 12. The grooves 16 of the one set have a vertical depth of about 0.4 millimeter, and the grooves 18 of the other set have a vertical depth of about 0.25 millimeter. Preferably, the grooves 18 of the other set have the bottom portions 22 of the sides thereof, adjacent the vertexes, sloped at an angle of about 65 degrees. The purpose of this steeper slope is to allow two sides of each log 12 to be supported firmly against the sides of the supporting groove 18. Since it is difficult to machine a perfect V-shaped groove near the vertex, the greater slope at the vertex provides sufficient tolerance for the corner of each log 12 to allow two adjacent sides thereof to fit snugly against the sides of the supporting groove 18. In manufacturing video disc styli, it is important to have a snug fit so that the conductive material is deposited uniformly on only two sides of each diamond log 12. The processing tray 14 is made of a material suitable for use at high temperatures ($\sim$500 degrees C.) in a vacuum deposition chamber.

The apparatus 10 further comprises an aligning tray 24 having a plurality of grooves 26 adjacent a surface 28 thereof and parallel to each other. The grooves 26 of the aligning tray 24 have a depth greater than the depth of the grooves 18 of the other set and have a periodicity equal to the periodicity of the grooves 18 of the other set. The grooves 26 of the aligning tray 24 are substantially V-shaped and disposed adjacent each other, and have a depth of about 0.8 millimeter and a side slope of about 45 degrees, as shown in FIG. 2. The aligning and processing trays 24 and 14 are positioned in tandem so that the grooves 18 of the other set are aligned with the grooves 26 of the aligning tray 24. Preferably, the vertexes of the grooves 18 of the other set are positioned about 50 micrometers below the vertexes of the grooves 26 of the aligning tray 24, in order to facilitate movement of the diamond logs 12 from the aligning tray 24 to the processing tray 14, as explained further below.

The apparatus 10 further comprises means 30 for vibrating the aligning and processing trays 24 and 14 positioned adjacent thereto. The vibrating means 30 is adapted to move the diamond logs 12 disposed in the grooves 16, 18, and 26 along a direction from the aligning tray 24 to the processing tray 14. In the present embodiment, the vibrating means 30 comprises a linear vibrator which supports a bar block 32 upon which the aligning and processing trays 24 and 14 are mounted, as illustrated in FIG. 1.

A workpiece holder 34 is positioned adjacent the end 36 of the processing tray 14 opposite the aligning tray 24. The workpiece holder 34 is adapted to stop the movement of the diamond logs 12 along the grooves 18 of the other set at the end 36 of the processing tray 14, but to allow the movement of the diamond logs 12 to continue along the grooves 16 of the one set. The workpiece holder 34 may comprise any type of structure which is shaped to perform the above function. In the present embodiment, the holder 34 is structured like an L-shaped comb and has teeth 38 disposed adjacent the grooves 16 of the one set, as shown in FIG. 3.

The apparatus 10 may further comprise means positioned above the aligning tray 24 for dispersing the diamond logs 12 over the grooves 26 of the aligning tray 24 at one end 40 thereof, and means positioned below the end 36 of the processing tray 14, opposite the aligning tray 24, for collecting the logs 12 allowed to move past the workpiece holder 34. In the present example, the dispersing means comprises a dispersing cone 42 connected to a feeding chute 44 adapted to function as a reservoir for the diamond logs 12. The collecting means comprises a conical chute 46 disposed above a container 48.

The method of loading the diamond logs 12 comprises joining the aligning tray 24 with the processing tray 14 in tandem so that the grooves 18 of the other set are aligned with the grooves 26 of the aligning tray 24, as illustrated in FIG. 2. Preferably, the vertexes of the grooves 18 of the other set are positioned about 50 micrometers below the vertexes of the grooves 26 of the aligning tray 24, in order to avoid any ridge that might hinder the movement of the diamond logs 12 from the aligning tray 24 to the processing tray 14. The workpiece holder 34 is positioned adjacent the end 36 of the processing tray 14 opposite the aligning tray 24.

A supply of diamond logs 12 is poured into the feeding chute 44. The logs 12 are then dispersed, by the dispersing cone 42, over the grooves 26 of the aligning tray 24 at one end 40 thereof while subjecting the aligning and processing trays 24 and 14 to the vibrating means 30. The vibrating means 30, a linear vibrator in the present example, moves the workpieces along the grooves 26 of the aligning tray 24 in a direction toward the processing tray 14. The purpose of the aligning-tray grooves 26 is to align the logs 12 in the same direction; the grooves 26 have a sufficient depth to align several logs 12, i.e., more than one layer, at the same location. As the diamond logs 12 meet the processing tray 14, they flow into the grooves 18 of the other set, which will hold only one layer since the side length of the grooves 18 is equal approximately to the width of the logs 12. The logs 12 which are in excess then fall below into the grooves 16 of the one set, which act as overflow grooves 16 and have sufficient depth to hold more than one layer. The logs 12 in the overflow grooves 16 move to the end 36 of the processing tray 14 and fall off the tray 14 into the container 48. However, the logs 12 in the grooves 18 of the other set move to the end 36 of the tray 14 and are held by the teeth 38 of the workpiece holder 34, as shown in FIG. 3.

The vibrating means is stopped when all of the grooves 18 of the other set are full, i.e., each groove 18 contains a full roll of single logs 12. The processing tray 14 is then removed from the aligning tray 24 and is ready to be loaded into a vacuum deposition chamber. Another processing tray may now be joined to the aligning tray 24 and the above loading process is repeated. Since each loaded processing tray 14 contains complete rows of single logs 12, the present novel technique enables a manufacturer to achieve maximum economy and yield during the subsequent deposition process.

What is claimed is:

1. An apparatus for loading workpieces comprising a processing tray having two parallel sets of grooves adjacent a surface thereof, the grooves of one set alternating with and having grooves of a depth greater than the depth of the grooves of the other set, said apparatus further comprising an aligning tray having a depth greater than the depth of the grooves of said other set and having a periodicity equal to the periodicity of the grooves of said other set, said aligning and said processing trays being positioned in tandem so that the grooves of said other set are aligned with the grooves of said aligning tray.

2. An apparatus as defined in claim 1 further comprising means for vibrating said aligning and said processing trays positioned adjacent thereto, said vibrating means adapted to move workpieces disposed in said grooves along a direction from said aligning tray to said processing tray, and further comprising a workpiece holder positioned adjacent the end of said processing tray opposite said aligning tray, and adapted to stop the movement of workpieces along the grooves of said other set but to allow the movement of workpieces along the grooves of said one set.

3. An apparatus as defined in claim 2 further comprising:
means positioned above said aligning tray for dispersing workpieces over the grooves of said aligning tray at one end thereof, and
means positioned below the end of said processing tray opposite said aligning tray for collecting workpieces allowed to move past said workpiece holder.

4. An apparatus as defined in claim 3 wherein said dispersing means comprises a dispersing cone connected to a feeding chute adapted to function as a reservoir for the workpieces, and wherein said collecting means comprises a conical chute disposed above a container.

5. An apparatus as defined in claim 2 wherein said grooves are substantially V-shaped and are positioned so that the vertexes of the grooves of said other set are about 50 micrometers below the vertexes of the grooves of said aligning tray, and wherein the side length of the grooves of said other set is equal approximately to the width of the workpieces.

6. An apparatus as defined in claim 5 wherein the grooves of said aligning tray are disposed adjacent each other, and have a depth of about 0.8 millimeter and a side slope of about 45 degrees.

7. An apparatus as defined in claim 6 wherein the grooves of said one set have a depth of about 0.4 millimeter and a side slope of about 45 degrees, and wherein the grooves of said other set have a depth of about 0.25 millimeter and a side slope of about 45 degrees.

8. An apparatus as defined in claim 7 wherein the grooves of said other set have the bottom portions of the sides thereof, adjacent the vertexes, sloped at an angle of about 65 degrees.

9. A method of loading workpieces comprising the steps of:
joining an aligning tray with a processing tray having two parallel sets of grooves adjacent a surface thereof, the grooves of one set alternating with and having a depth greater than the depth of the grooves of the other set, said aligning tray having a plurality of parallel grooves adjacent a surface thereof and having a depth greater than the depth of the grooves of the other set, said aligning and processing trays being positioned in tandem so that the grooves of said other set are aligned with the grooves of said aligning tray, positioning a workpiece holder adjacent the end of said processing tray opposite said aligning tray, said holder adapted to stop the movement of workpieces along the grooves of said other set but to allow the movement of workpieces along the grooves of said one set, and dispersing said workpieces over the grooves of said aligning tray while subjecting said aligning and said processing trays to vibrating means positioned adjacent thereto, said vibrating means adapted to move workpieces disposed in said grooves along a direction from said aligning tray to said processing tray.

10. A method as recited in claim 9 wherein said grooves are substantially V-shaped and are positioned so that the vertexes of the grooves of said other set are about 50 micrometers below the vertexes of the grooves of said aligning tray, and wherein the side length of the grooves of said other set is equal approximately to the width of the workpieces.

11. A method as recited in claim 10 wherein the grooves of said aligning tray are disposed adjacent each other, and have a depth of about 0.8 millimeter and a side slope of about 45 degrees.

12. A method as recited in claim 11 wherein the grooves of said one set have a depth of about 0.4 millimeter and a side slope of about 45 degrees, and wherein the grooves of said other set have a depth of about 0.25 millimeter and a side slope of about 45 degrees.

13. A method as recited in claim 10 wherein said workpieces comprise diamond logs having a width of approximately 0.35 millimeter.

* * * * *